(12) United States Patent
Jackson et al.

(10) Patent No.: US 6,601,179 B1
(45) Date of Patent: *Jul. 29, 2003

(54) CIRCUIT AND METHOD FOR CONTROLLING POWER AND PERFORMANCE BASED ON OPERATING ENVIRONMENT

(75) Inventors: Robert T. Jackson, San Jose, CA (US); Stephen P. Nachtsheim, Atherton, CA (US); Taufik T. Ma, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/307,324

(22) Filed: May 7, 1999

Related U.S. Application Data

(63) Continuation of application No. 08/850,232, filed on May 2, 1997, now Pat. No. 5,974,556.

(51) Int. Cl.[7] .............................. G06F 1/26; G06F 1/28; G06F 1/30; G06F 13/00
(52) U.S. Cl. ...................... 713/322; 713/300; 713/320; 713/501; 710/302; 710/303; 710/304
(58) Field of Search ................................. 713/300, 310, 713/320, 322, 324, 340, 500, 501; 375/347; 709/222; 327/142; 340/870.19; 380/4; 361/686; 710/300, 302, 303, 304, 301

(56) References Cited

U.S. PATENT DOCUMENTS

| | | | | |
|---|---|---|---|---|
| 4,238,784 A | * | 12/1980 | Keen et al. | 340/347 |
| 4,825,337 A | * | 4/1989 | Karpman | 361/386 |
| 5,134,398 A | * | 7/1992 | Yasutake et al. | 341/119 |

(List continued on next page.)

FOREIGN PATENT DOCUMENTS

| | | |
|---|---|---|
| EP | 0474963 A2 | 3/1992 |
| EP | 0539884 A1 | 5/1993 |
| EP | 0566395 A1 | 10/1993 |
| EP | 0632360 A1 | 1/1995 |

OTHER PUBLICATIONS

Charles P. Schultz, Dynamic Clock Control for Microprocessor System Energy Management, Motorola Inc., Technical Developements, vol. 14, Dec. 1991, pp 53–54, Schaumburg, Illinois.

Dynamic Power Management By Clock Speed Variation, IBM Technical Disclosure Bulletin, vol. 32, No. 8B, Jan. 1990, pp 373, Armonk, NY.

*Primary Examiner*—Frantz B Jean
(74) *Attorney, Agent, or Firm*—Blakely, Sokoloff, Taylor & Zafman LLP

(57) ABSTRACT

A power control circuit and corresponding technique for controlling the reduction or augmentation of operating frequency and/or supply voltage utilized by an electronic device. Such control is based on the operating environment of the hardware product employing the electronic device by determining whether the hardware product is interconnected to an external source having at least one enhanced cooling mechanism. As a result, the hardware product is able to operate at full frequency and voltage during certain situations and to operate at a reduced frequency and/or voltage during other situations.

41 Claims, 9 Drawing Sheets

U.S. PATENT DOCUMENTS

| | | | |
|---|---|---|---|
| 5,254,992 A | * 10/1993 | Keen et al. | 341/119 |
| 5,369,771 A | * 11/1994 | Gettel | 713/300 |
| 5,381,043 A | * 1/1995 | Kohiyama et al. | 307/116 |
| 5,478,221 A | * 12/1995 | Loya | 417/313 |
| 5,537,343 A | * 7/1996 | Kikinis et al. | 364/708.1 |
| 5,550,710 A | * 8/1996 | Rahamim et al. | 361/687 |
| 5,598,537 A | * 1/1997 | Swanstrom et al. | 710/101 |
| 5,598,539 A | * 1/1997 | Gephardt et al. | 710/101 |
| 5,625,829 A | * 4/1997 | Gephardt et al. | 712/1 |
| 5,648,762 A | * 7/1997 | Ichimura et al. | 340/825.31 |
| 5,664,118 A | * 9/1997 | Nishigaki et al. | 710/103 |
| 5,721,837 A | * 2/1998 | Kikinis et al. | 710/101 |
| 5,745,041 A | * 4/1998 | Moss | 340/635 |
| 5,745,375 A | * 4/1998 | Reinhardt et al. | 364/492 |
| 5,760,636 A | | 6/1998 | Noble et al. | 327/513 |
| 5,798,951 A | * 8/1998 | Cho et al. | 364/708.1 |
| 5,884,049 A | * 3/1999 | Atkinson | 710/101 |
| 5,930,110 A | * 7/1999 | Nishigaki et al. | 361/686 |
| 6,275,945 B1 | * 8/2001 | Tsuji et al. | 713/300 |

* cited by examiner

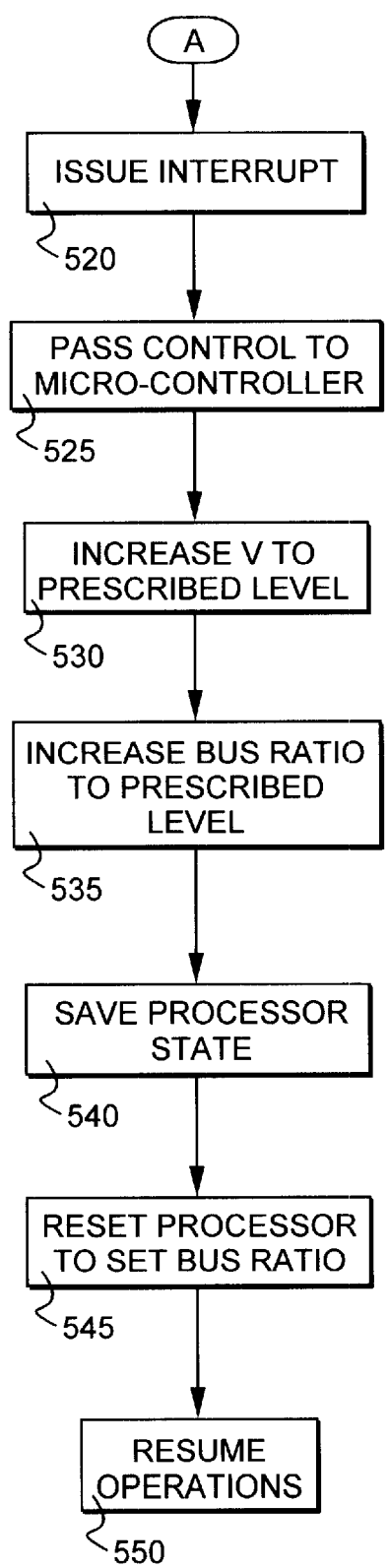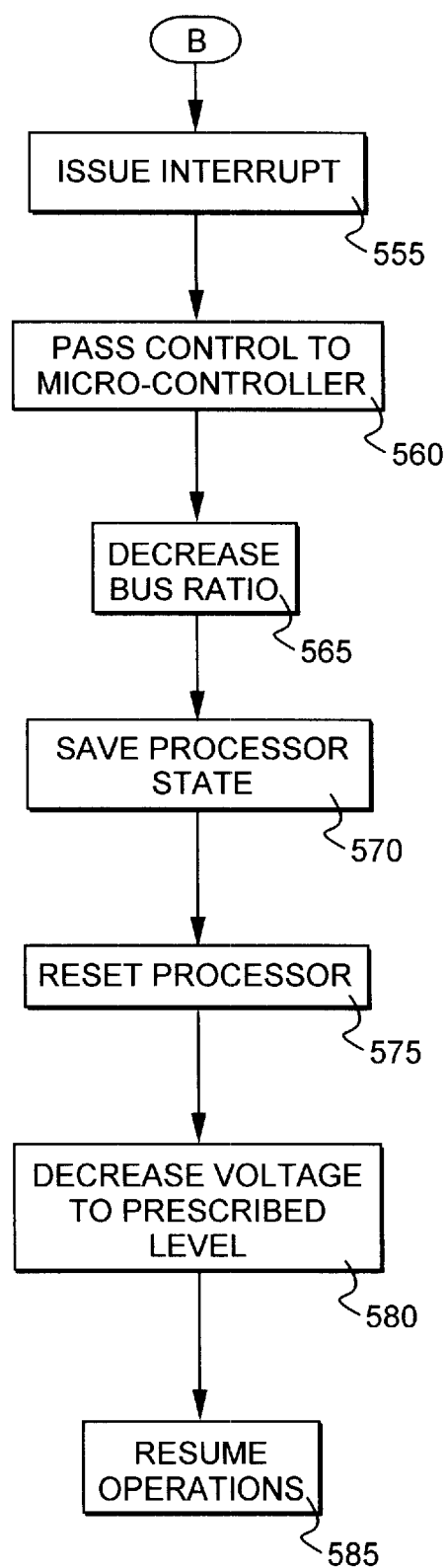
FIG. 5B  FIG. 5C

CIRCUIT AND METHOD FOR CONTROLLING POWER AND PERFORMANCE BASED ON OPERATING ENVIRONMENT

This is a continuation of U.S. Ser. No. 08/850,232 filed May 2, 1997 now U.S. Pat. No. 5,974,556.

BACKGROUND OF THE INVENTION

1. Field of the Invention

The present invention relates to the field of power management. More particularly, the present invention relates to a circuit and a method for configuring an electronic device to operate in one of a plurality of power states based on the operating environment of its hardware product.

2. Description of Art Related to the Invention

Over the last few years, there have been many advances in semiconductor technology. These advances have lead to the development of high-speed electronic devices operating at higher frequencies and supporting additional and/or enhanced features. As a result, high-speed electronic devices normally require more power and dissipate more heat as a by-product than antiquated electronic devices operating at lower frequencies.

In order to satisfy customer requirements, battery-powered portable computers (e.g., laptop or notebook style computers, hand-held computers, etc.) are implemented with high-speed processors similar to those implemented in desktop computers. Normally, the heat produced by internal logic of conventional portable computers is dissipated through passive cooling. For portable computers, "passive cooling" involves spreading the heat uniformly along an interior of its casing. Thereafter, the casing of the portable computer is simply cooled through conduction, convection and radiation.

In light of the semiconductor technology advances, standard passive cooling techniques are now becoming unable to provide sufficient thermal dissipation for portable computers. When the high-speed processor is operating at full frequency, the surface temperature of the casing of the portable computer tends to rise above a temperature considered acceptable by the Occupational Safety and Health Association (OSHA) and/or portable computer users. As a result, power usage by conventional portable computers must be reduced in order to prevent the surface temperature of the casing from rising above this temperature.

Commonly, power usage of portable computers is reduced by decreasing processor core operating frequency at manufacturing to a static value which will not exceed the portable computer's passive cooling capability. In general, processor core operating frequency is an external clock, or bus frequency, multiplied by a fixed bus ratio which is set by hardware at processor reset. The processor core operating frequency may be decreased by lowering the bus ratio or by lowering the frequency of the external clock supplied to the processor (hereinafter referred to as "frequency reduction"). Frequency reduction at a fixed bus ratio may be accomplished by dividing the clock signal before it is supplied to the processor. Alternatively, frequency reduction at a fixed bus ratio may be emulated by periodically halting the clock signal for brief time intervals so that the average operating frequency is reduced.

Referring to FIG. 1, a graph illustrating power savings realized by conventional frequency reduction of an electronic device (e.g., a processor) is shown. It is well-known that a processor is designed to operate across a frequency range at a specific voltage. This operating range 100 is represented as being between points A and B, where (i) point A represents the minimum operating frequency at which the processor will operate, and (ii) point B represents the maximum operating frequency that the processor can support. In theory, to a first order approximation, power is directly proportional to frequency as presented herein. Thus, as shown through points C and D, a reduction in the operating frequency of the processor by ten percent (10%) will reduce its total power consumption by ten percent (10%) from P1 to P2. Of course, true system power savings are not exactly proportional to frequency reduction because most every hardware product, including a portable computer, is implemented with processor frequency-independent components which consume power (e.g., a display).

However, the use of static power saving techniques has generated performance gaps between desktop computers and portable computers. This performance gap is a continuing concern to original equipment manufacturers (OEMs). One reason is that substantial differences in performance will adversely effect the demand for portable computers and for components used therein. To date, it appears that no efforts have been made in controlling the reduction or augmentation of the operating frequency and/or supply voltage utilized by an electronic device, including a processor, based on the operating environment experienced by its hardware product.

Besides complying with its thermal dissipation constraints, a battery-powered portable computer is configured to reduce its power usage in order to extend the life of its removable battery packs. The typical technique in reducing power usage is not dependent on the operating environments of the portable computer. Rather, it is usually dependent on a system dependent, power management system which, through a combination of software and hardware, is able to put unused sub-systems into sleep or shut-down modes thus saving power.

SUMMARY OF THE INVENTION

The present invention relates to a circuit and method altering performance of an electronic device implemented within the hardware product. With respect to the method, at least two operational steps are performed. First, a determination is made as to whether the hardware product is coupled to an external source having an enhanced cooling mechanism. Thereafter, at least an operating frequency of the electronic device is adjusted in response to the determination stated above.

BRIEF DESCRIPTION OF THE DRAWINGS

The features and advantages of the present invention will become apparent from the following detailed description of the present invention in which:

FIGS. 5A–5C are illustrative flowcharts of the operations performed by the present invention in order to increase or reduce performance of the electronic device through voltage and frequency scaling based on the operating environment of the hardware product of FIG. 4.

DETAILED DESCRIPTION OF THE PREFERRED EMBODIMENT

The detailed description describes a power control circuit and method for enabling an electronic device to operate in a plurality of power states in order to reduce power usage. Selection of the power states is dependent on the operating environment of a hardware product implemented with the electronic device; namely, whether an external source having an enhanced cooling mechanism is coupled to the hardware product. Although certain details are set forth in order to provide a thorough understanding of the present invention, it is apparent to a person of ordinary skill in the art that the present invention may be practiced through many different embodiments, other that those embodiments illustrated, without deviating from the spirit and scope of the present invention. In other instances, well-known circuits, elements and the like are not set forth in detail in order to avoid unnecessarily obscuring the present invention.

Herein, a number of terms and symbols are frequently used to describe logic, information or characteristics. An "electronic device" is a single integrated circuit (IC) component or a multiple IC components operating in tandem. Examples of an electronic device include, but are not limited or restricted to, a processor, micro-controller, and a chipset. "Hardware product" is broadly defined as any commercial or non-commercial goods having the electronic device. Examples of a hardware product include, but is not limited or restricted to, a portable computer (e.g., a laptop or notebook computer, hand-held computer, etc.), a wireless telephone, camcorder, still-camera, video cassette recorder, set-top cable box, a video game system and the like. A "communication line" is broadly defined as one or more information-carrying mediums (e.g., electrical wire, a bus line, fiber optics, a wireless communication channel, an infrared "IR" link, a radio frequency "RF" link, etc.).

In addition, a "bus ratio" (sometimes referred to as "bus-to-core frequency ratio") is a code setting the operating frequency of the electronic device to a selected multiple of a bus frequency. For example, if the bus frequency is set to sixty-six megahertz (66 MHz), a particular code could set the operating frequency of the electronic device to be 133 MHz (2×66 MHz). The symbol "#" denotes that a signal is active-low, although the signal could be modified to be active-high in the alternative.

Figure 2A:
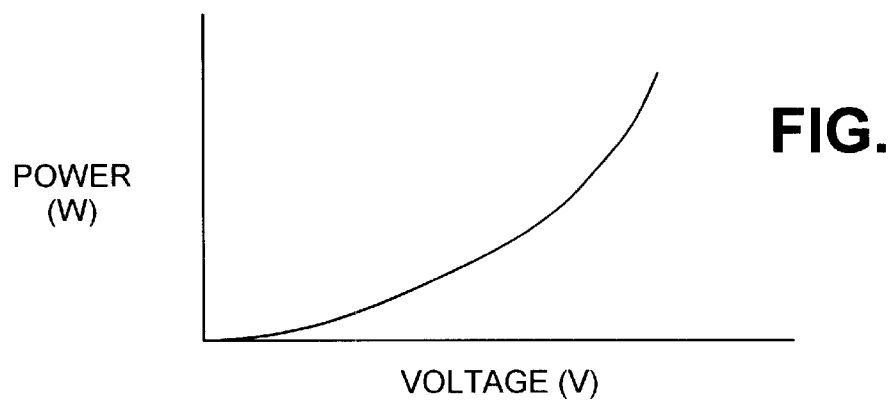
FIG. 2A is an illustrative diagram of the theoretical "squared" relationship between voltage and power when a constant frequency is applied.

Referring to FIG. 2A, an illustrative graph of the theoretical relationship between voltage and power at a constant frequency is shown. As noted in Equation 1 below, it is theoretical fact that power has a "squared" law dependence with voltage and a generally proportional relationship with operating frequency.

$$\text{Power} = C \times V^2 \times F \times \text{Act} \qquad \text{Equation 1}$$

where

"C"=total capacitance of the electronic device;

"V"=total voltage supplied to the electronic device;

"F"=operating frequency of the electronic device; and

"Act"=percentage of gates of the electronic device changing state for a given clock cycle.

Thus, according to Equation 1, a ten percent decrease (10%) in voltage at a constant frequency constitutes a nineteen percent (19%) decrease in power since $(0.81) \times \text{Power} = C \times (0.90V)^2 \times F \times \text{Act}$.

Figure 1:
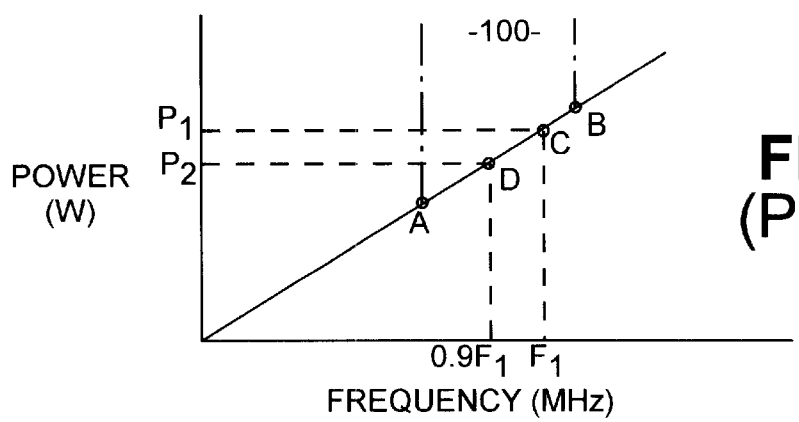
FIG. 1 is an illustrative diagram of theoretical power savings realized by a frequency reduction technique when a constant voltage is applied.
Figure 2B:
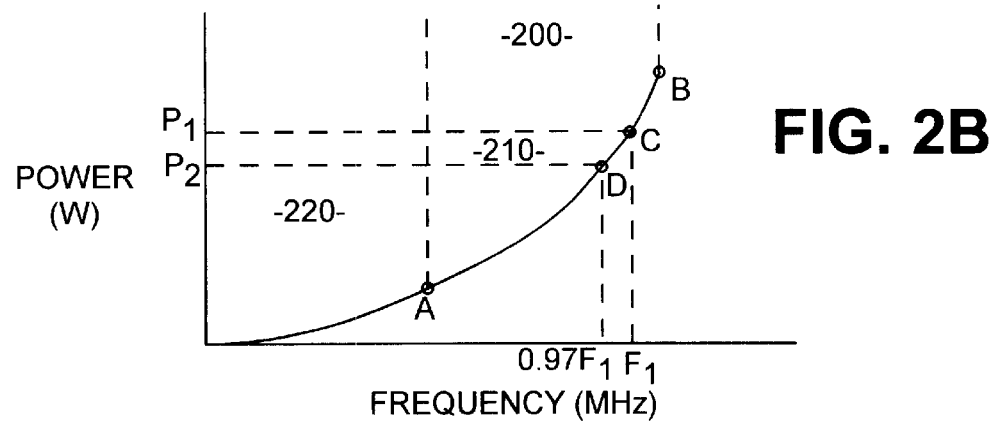
FIG. 2B is an illustrative diagram of power savings realized by an electronic device which is controlled through voltage and frequency scaling with a variable voltage being the minimum voltage which will support that operating frequency.

Referring now to FIG. 2B, an illustrative graph of the power saving realized by an electronic device by performing combined voltage and frequency scaling is shown, when the electronic device is always operating at the lowest voltage which will support the operating frequency. Similar to FIG. 1, the electronic device is operational within a voltage range 200 which is defined between point A (minimum operating voltage of the electronic device) and point B (maximum operating voltage). Furthermore, to be consistent with FIG. 1, points C and D represent voltage range 210 consistent with the operational frequency of the electronic device at power states P1 and P2, respectively. Thus, by decreasing the operational frequency and voltage of the electronic device (at point C) by slightly over three percent (to point D), the power consumed by the electronic device is decreased by approximately ten percent (10%) since $$C \times (0.966V)^2 \times (0.966F) \times \text{Act} \approx (0.901) \times \text{Power}.$$

Clearly, while the realized power savings is generally equivalent to that obtained through frequency reduction, the operating frequency of the electronic device has diminished only about three percent (3%) rather than ten percent (10%). It is contemplated that voltage and frequency scaling may occur in voltage range 200; however, only frequency scaling may occur for the electronic device along a low-voltage range 220 up to point A. This is due to the fact that voltage scaling in the low-voltage range 220 would cause the electronic device to become inoperative.

Figure 3A:
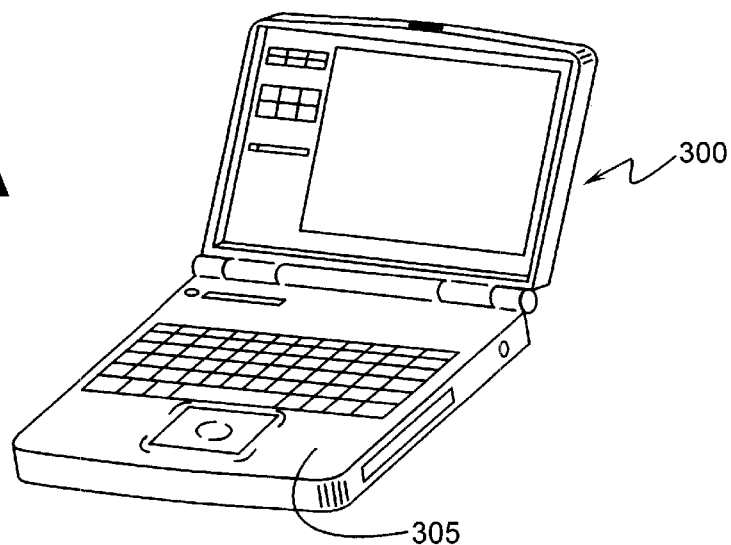
FIGS. 3A–3F are illustrative diagrams of a hardware product placed into operating environments which would preferably cause an electronic device within the hardware product to be automatically set into a low power mode, a high power mode and an intermediate power mode, respectively.

Referring to FIGS. 3A–3F, illustrative views of different operating environments available to a hardware product (e.g., a portable computer) is shown. For example, as shown in FIG. 3A, a portable computer 300 is powered from one or more removable battery packs (not shown) for use at any location with or without an alternating current (AC) power supply (e.g., within a vehicle of transport). In this operating environment, it would be desirable to operate certain electronic devices of portable computer 300 at a reduced frequency and/or voltage level (e.g., at a low power state) for a number of reasons. One reason is that reduced power usage would result, extending battery life of portable computer 300. Another reason is that, for this usage, the cooling of the electronic devices is dependent on the passive cooling implemented in the portable computer, possibly augmented with a small, battery operated fan. If its electronic devices are operating at a high power state, the electronic devices will exceed their temperature specification which may cause portable computer 300 to fail. Moreover, the surface temperature of casing 305 may increase to cause discomfort to the user, adjacent persons, or to adverse effect material in contact with casing 305.

Figure 3B:
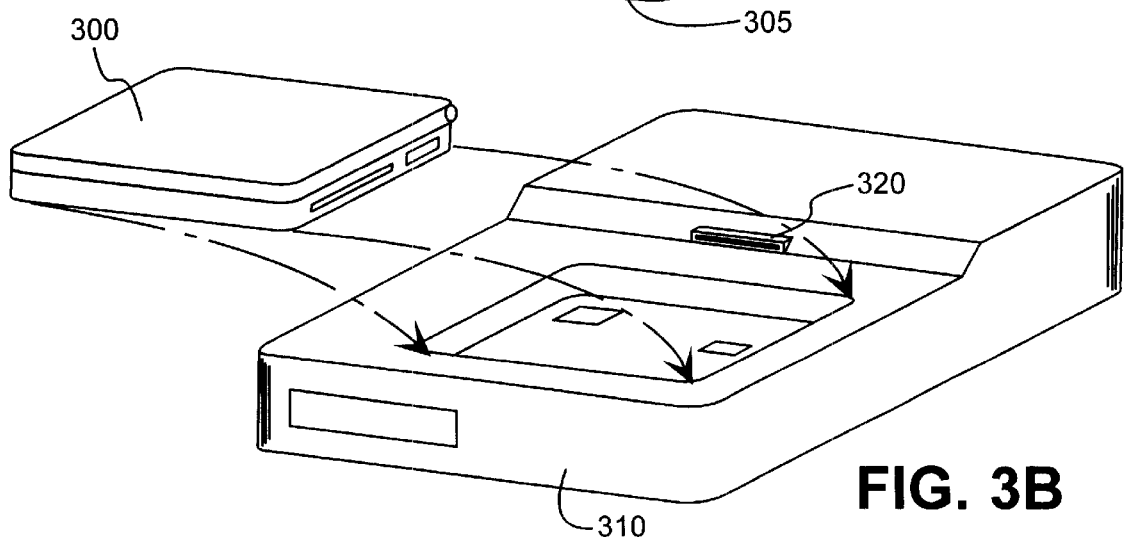

Referring now to FIG. 3B, portable computer 300 is placed ("docked") in a docking station 310 and attached to a connector 320 of the docking station 310. Connector 320 may be adapted as an interface for portable computer 300 to (i) provide thermal reduction through connectivity of enhanced cooling mechanisms provided by an external source such as docking station 310, (ii) receive DC power, and (iii) operate as an logical connection to propagate signals to control various peripheral devices normally reserved for desktop computers (e.g., an extended keyboard, mouse, modem or networking transceiver, compact disk read only memory "CD ROM" drive, etc.). It is contemplated, however, that a separate connector dedicated for enhanced cooling may be employed in lieu of or in combination with connector 320. In this operating environment, it would be desirable to operate an electronic device(s) within portable computer 300 at a high power state, possibly the highest power state supported by the electronic device(s).

Examples of these enhanced cooling mechanisms may include, but are not limited or restricted to, the use of heat transfer elements, heat exchangers and/or thermo-electric coolers in combination with one or more AC-powered fans. Typically, although not shown herein, a first interlock mechanism (e.g., a sensor type construction) is employed within portable computer 300 in order to generate a signal when portable computer 300 is appropriately coupled to docking station 310.

Figure 3E:
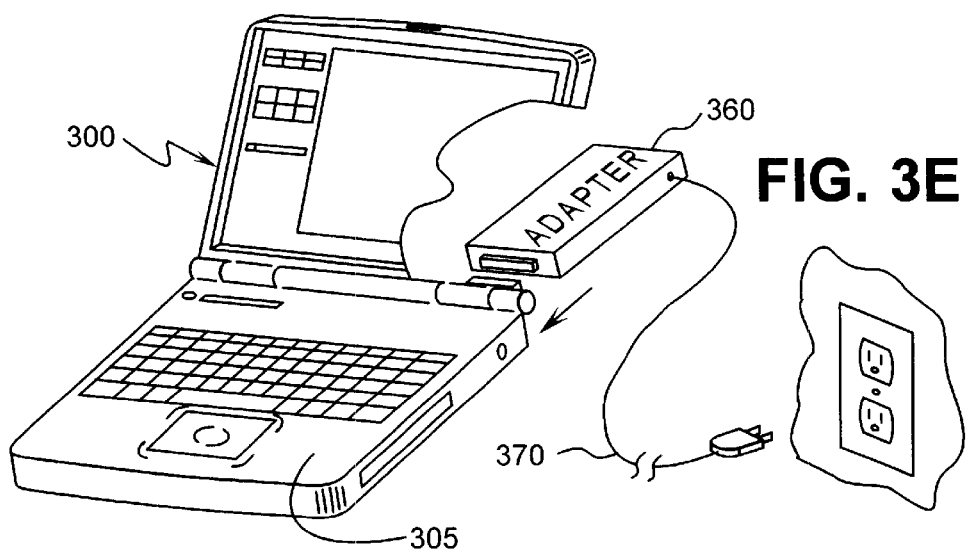
Figure 3C:
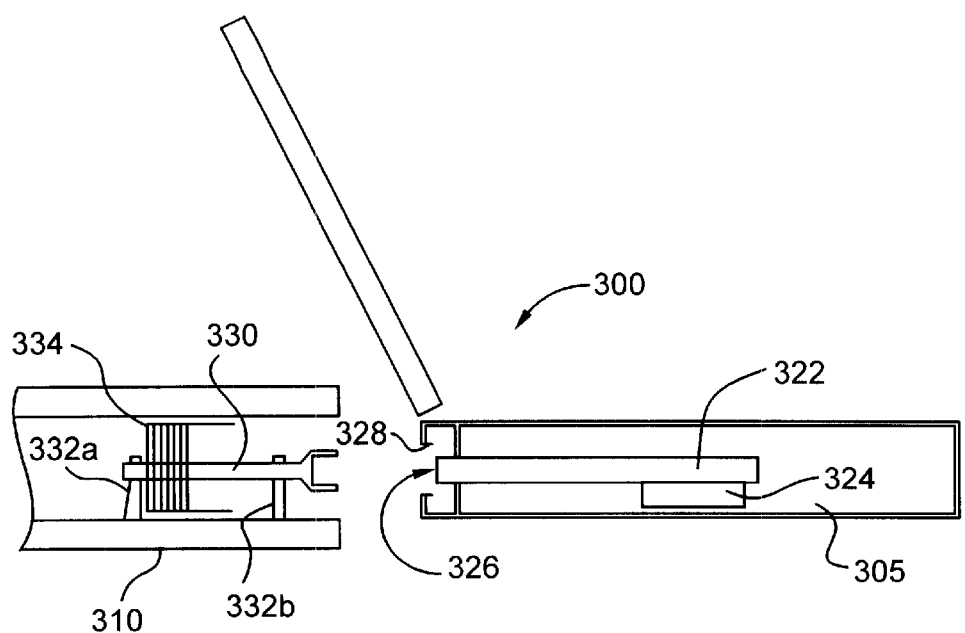

More specifically, as shown in FIG. 3C, one embodiment of an enhanced cooling mechanism may include the implementation of a heat transfer element 322 (e.g., heat pipe) within portable computer 300 to remove heat from at least one electronic device. The heat transfer element 322 is thermally coupled to electronic device 324 by directly mounting itself to electronic device 324 or via several heat conducting components (e.g., a heat conducting block affixed using solder, thermal epoxy, or other suitable material).

An end portion 326 of heat transfer element 322 may be exposed through a closeable aperture at a mating end of portable computer 300 when docked. Mechanisms well known in the art may be used to cause a door 328 to open the closeable aperture, either automatically or manually.

The docking station 310 includes a second heat transfer element 330. The second heat transfer element 330 is secured to the docking station 310 by a pair of mounting brackets 332a and 332b. Other known mounting mechanisms may be used as is convenient for a particular docking station configuration. For instance, only a single mounting bracket may be used, or more than two mounting brackets may be used. A set of heat dissipation fins 334 as well as second heat transfer element 330 form a heat dissipation mechanism which dissipates heat in docking station 310.

A heat exchange mechanism is formed by joining the heat transfer elements 322 and 330 together. One end of the heat transfer element 330 conformably engages the end portion 326 of heat transfer element 322 when docking station 310 and the portable computer 300 mate. As illustrated, in one embodiment, the heat exchange mechanism is formed by a female end of the heat transfer element 330 engaging a male connector end of the heat transfer element 322. Alternately, these mechanisms may be reversed; however, the smaller male end is more appropriate for portable computer 300.

Figure 3D:
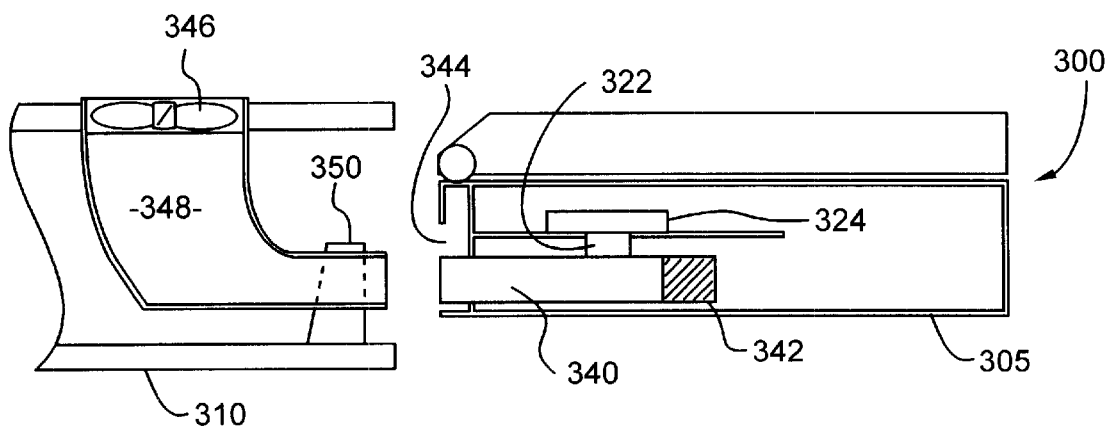

Another embodiment of an enhanced cooling mechanism may include implementation of an air cooling duct system as shown in FIG. 3D. The heat transfer element 322 is implemented to remove heat from electronic device 324. Heat transfer element 322 conveys heat away from electronic device 324 to a heat exchange duct 340. A vent 342 allows air to easily enter or exit a first end of the heat exchange duct 340. Typically, vent 342 forms an inlet as cool air is drawn in through heat exchange duct 340 and warm air is dispelled at a second end of heat exchange duct 340. Vent 342 may also be covered by a protective screen to reduce the intake of dust and particles.

The second end of heat exchange duct 340 is positioned at the mating edge of the portable computer 300 aligned with an aperture 344. In one embodiment, aperture 344 is mechanically opened, and the second end of the heat exchange duct 340 exposed, only when portable computer 300 and the docking station 310 are in a mated (docked) position. In another embodiment, the second end of heat exchange duct 340 may be permanently exposed to continuously allow connective airflow.

In general, docking station 310 forces air through the portable computer's heat exchange duct 340 using one of a variety of forced air mechanisms. The forced air mechanism operatively engages heat exchange duct 340, meaning that it causes an increased airflow, either drawing or blowing air through that duct 340. The forced air mechanism and the duct need not be intimately mated, but rather may be positioned in close proximity to each other, so long as increased airflow through heat exchange duct 340 results. Since docking station 310 and portable computer 300 may be mated and unmated, a removably engaged heat exchange mechanism is formed. As discussed above, higher performance may be obtained from portable computer 300 with the additional cooling capacity.

As further shown in FIG. 3D, the forced air mechanism includes a fan 346 and a second heat exchange duct 348. Second heat exchange duct 348 is secured to the housing of docking station 310 by a mounting element 350. The fan 346 is mounted in the housing of docking station 310 to provide relatively unencumbered airflow. Air may flow in either direction; however, it is preferable that fan 346 pull air through ducts 340 and 348. Additionally, fan 346 may be mounted in the top, bottom, or either side of the docking station as is convenient in a particular docking station configuration.

Figure 4:
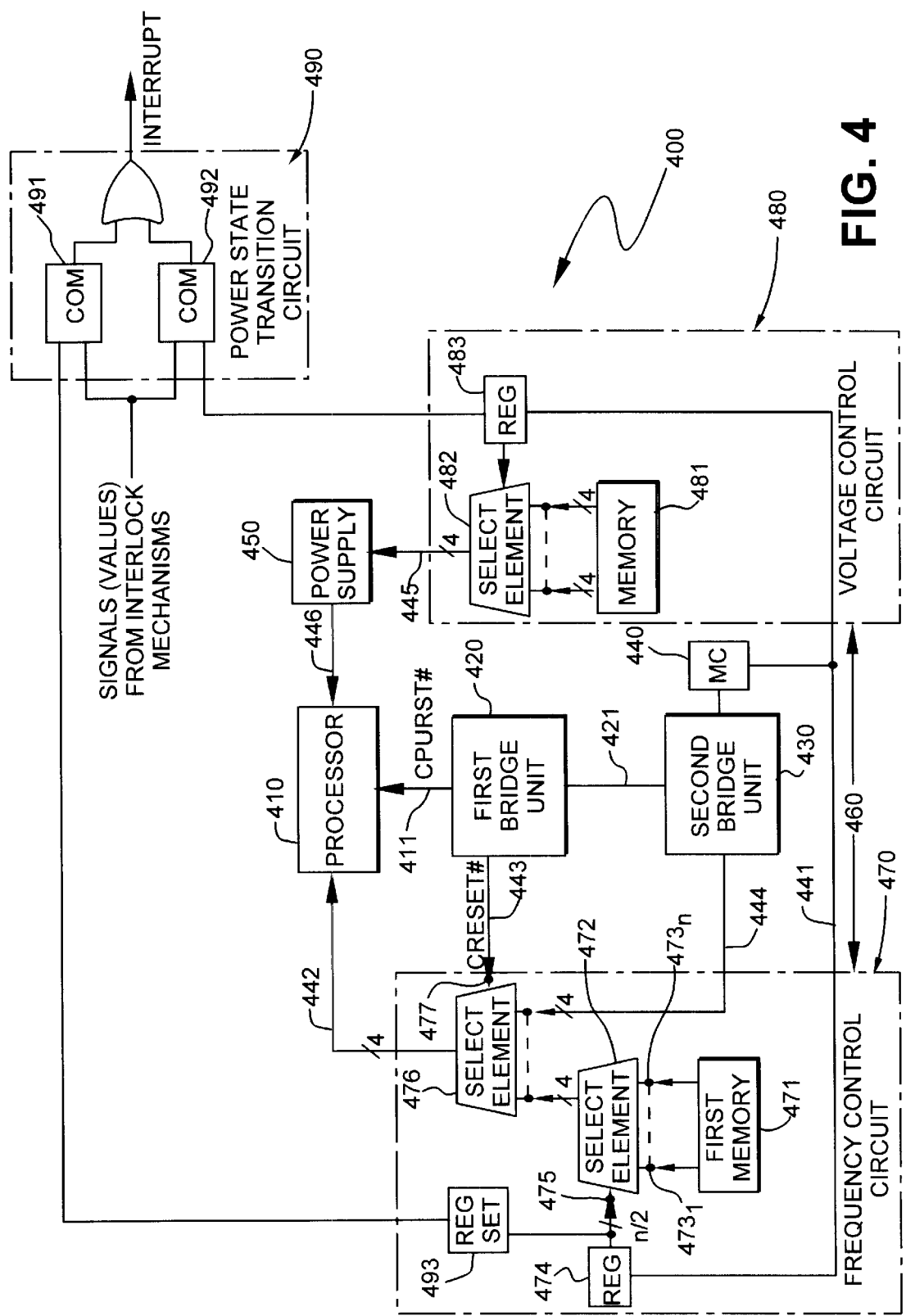
FIG. 4 is an illustrative block diagram of a hardware product implemented with a first embodiment of a power control circuit used to alter the power state of an electronic device through voltage and frequency scaling.

Referring to FIG. 3E, portable computer 300 is directly connected to a power supply brick 360. Power supply brick 360 includes circuitry that converts AC power (received from a power cable 370 plugged into an electrical outlet) into DC power to be provided to portable computer 300. Also, power supply brick 360 includes an enhanced cooling mechanism which can be used by portable computer 300 to reduce thermal temperature inside casing 305. In this operating environment, it may be desirable to operate electronic devices within portable computer 300 at an intermediate power state because (i) DC power is being supplied from an external source; and (ii) power supply brick 360 includes an enhanced cooling mechanism (e.g., an AC powered fan). Signaling that power supply brick 360 is coupled to portable computer 300 is provided through a second interlock mechanism (not shown). Of course, it is contemplated that any number of power states may be supported as shown in FIG. 4.

Figure 3F:
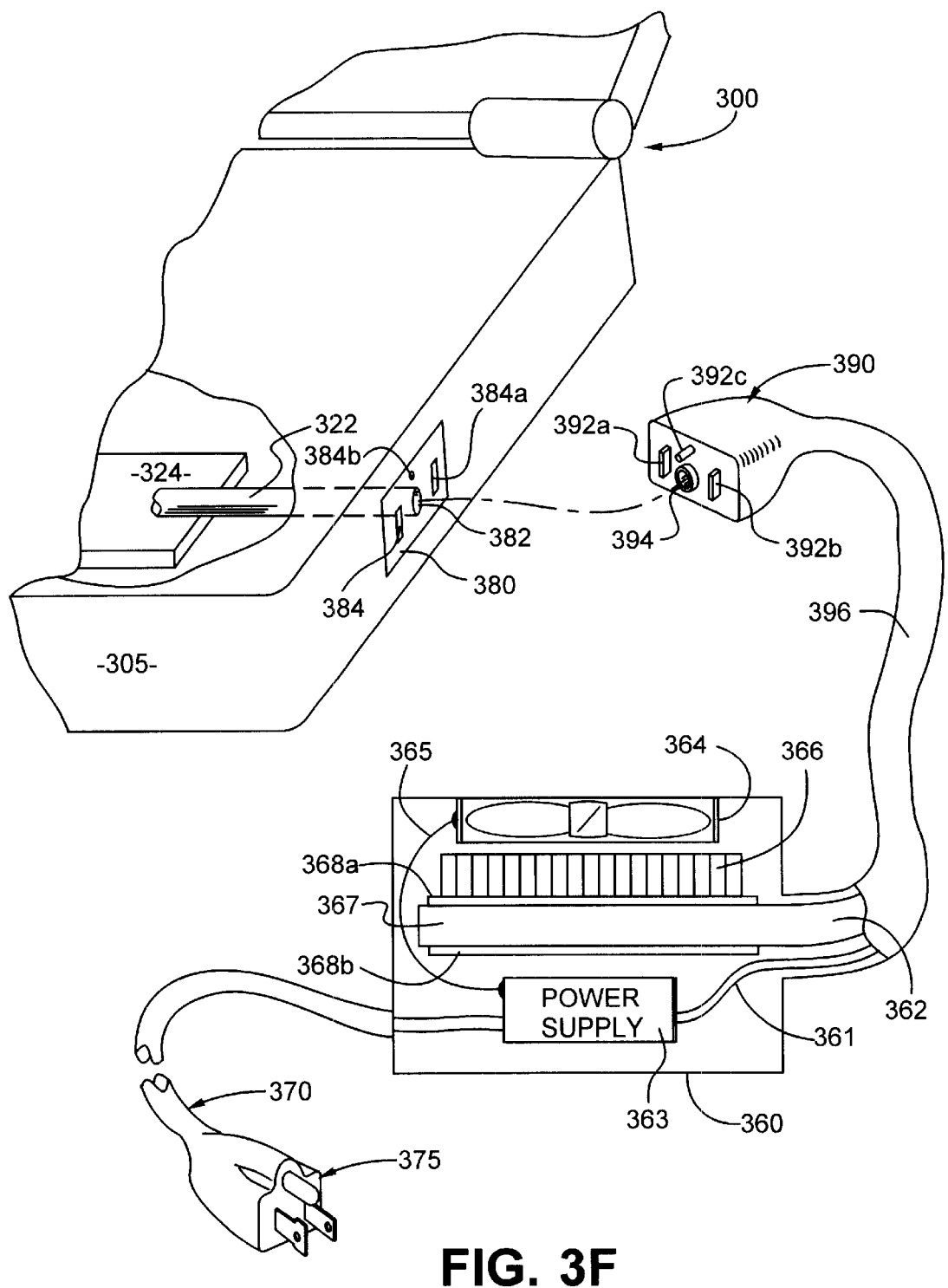

The cooling effect of power supply brick 360 is illustrated in detail in FIG. 3F in which an alternative position (side) of casing 305, besides a rear portion of casing 305, is implemented with a receptacle (port) for power supply brick 360. In this embodiment, heat transfer element 322 conveys heat away from the electronic device 324 to a receptacle 380. Receptacle 380 is formed at an exterior surface of casing 305, although the surface may be recessed and/or receptacle 380 may be protected by a covering or a door when not in use. Receptacle 380 may be either formed as a separate component and affixed to casing 305, or may form a part of casing 305 itself.

Receptacle 380 includes a thermal mating connector 382, and a plurality of electrical connectors 384a, 384b, and 384c. In one embodiment, receptacle 380 is recessed into casing 305 of the portable computer 300 and includes male electrical and thermal connectors. In other embodiments, female connectors, or a combination of male and female connectors, may be used.

A plug 390 includes a plurality of electrical connectors 392a, 392b, and 392c which cooperatively engage the connectors 384a, 384b, and 384c, respectively. A thermal mating connector 394 thermally engages the thermal mating connector 382 when plug 390 mates with receptacle 380. A thermal-electrical cable 396 connected to plug 390 carries a set of electrical conductors 361 and a flexible thermal conductor 362 to power supply brick 360.

Receptacles and plugs are well known mechanisms and any appropriate prior art connector, receptacle, or plug structure may be used. For example, the mechanical engaging structures may be changed, as may the number, type, or arrangement of the particular electrical connectors used.

Additionally, any appropriate thermal connectors may be used. In one embodiment, heat transfer element 322 may include a heat pipe with an open cylindrical end for thermal mating connector 382. The open cylindrical end is adapted to engage one end of a flexible heat pipe extending from plug 390. The engaging portion flexible heat pipe may be mounted in a similarly shaped copper or other rigid heat conductive connector to ensure proper mating with receptacle 380. In other words, an end portion of the heat pipe may be encased in a metal connector. Thus, in one embodiment, the flexible heat pipe or a heat conductive connector attached thereto forms thermal mating connector 394, and the flexible heat pipe forms the flexible thermal conductor 362 extending through thermal-electric cable 396 and into power supply brick 360.

Power supply brick 360 is also a heat dissipation brick because it contains heat dissipation mechanisms in addition to power supply components. In alternate embodiments, these components could be supplied in separate housings or completely independently of each other. The combination, however, advantageously reduces the number of components outside portable computer 300 and allows the use of active (i.e., requiring electricity) heat dissipation mechanisms. Additionally, in other embodiments, the brick may take different shapes (cylindrical, square, or otherwise), and may perform either no function beyond heat dissipation or one or more additional functions such as power conversion or a data communication function.

As illustrated, power supply brick 360 includes a power supply circuit 363. A plug 375 supplies alternating current (AC) from an electrical outlet to power supply circuit 363 through power cable 370. The power supply circuit 363 provides power to portable computer 300 via the electrical conductors 361 and the electrical connectors 392a, 392b, and 392c. Power supply 363 also supplies power to a fan 364 via a second set of conductors 365.

In the illustrated embodiment, fan 364 cools a heat sink 366 which is attached to a portion 367 of flexible thermal conductor 362 by a top heat dissipation plate 368a. A bottom heat dissipation plate 368b further removes heat from the flexible thermal conductor 362. In one embodiment, the heat dissipation plates 368a and 368b are copper. In other embodiments, aluminum or other heat conductive materials may be used. Additionally, one or both of the plates 368a and 368b may be eliminated and heat sink 366 may be directly attached to the flexible thermal conductor 362.

When plug 375 is connected to the electrical outlet and plug 390 is mated with receptacle 380, portable computer 300 can receive additional power to improve the performance of certain components such as its processor. The additional heat dissipation mechanism provided by power supply brick 360 allows such additional power consumption without overheating or damaging components.

Referring now to FIG. 4, an illustrative embodiment of a power control circuit employed within a hardware product to control power usage by an electronic device in light of the existence of enhanced cooling mechanisms is illustrated. In this embodiment, the hardware product and electronic device are chosen to be illustrated as a portable computer and a processor, respectively. The hardware product is arbitrarily shown as a portable computer. Likewise, the electronic device is shown as a processor because of its reputation of being one of the primary power consuming electronic devices of a portable computer. However, as alternative embodiments, the power control circuit may be used to control power usage by other types of electronic devices such as a controller (within a wireless telephone or other hardware product), a graphics controller and chipsets for example.

Portable computer 400 comprises a processor 410 coupled to a first bridge unit 420 and a power supply circuit 450. While it is well-known that first bridge unit 420 operates as a communication gateway between processor 410 and at least main memory (not shown), it also provides reset capability to processor 410 as shown. More specifically, first bridge unit 420 is coupled to processor 410 via communication line 411. This enables first bridge unit 420 to transmit an active reset signal (CPURST#) through communication line 411 upon detecting an event such as processor 410 accessing a specific input/output (I/O) space. The first bridge unit 420 is further coupled to a second bridge unit 430 through a communication line 421 to support information transmissions between these bridge units 420 and 430. In this illustrative example, first bridge unit 420 is a chipset such as 44OBX™ manufactured by Intel Corporation of Santa Clara, Calif., although it is not limited or restricted to this type of chipset. The second bridge unit 430 may include a PCI-to-ISA bridge such as a PIIX4™ chipset manufactured by Intel Corporation.

A micro-controller 440 is coupled to second bridge unit 430 to control operations of a power control circuit 460. The status of the bus ratio and the status of the supply voltage are continuously compared with a predetermined interlock mechanism value by power state transition circuit 490. The predetermined value input into a first comparison set (COM) 491 and a second comparison set (COM) 492 depends on whether portable computer 400 is coupled to a docking station, a power supply brick, or any other peripheral used to providing enhanced cooling requirements. If first comparison set 491 (e.g., one or more comparators) outputs an active signal, it indicates that the status of the last bus ratio set differs from a targeted bus ratio associated with the current operational environment of portable computer 400.

Likewise, if the second comparison set 492 outputs an active signal, it indicates that the current level of supply voltage differs from an expected supply voltage associated with the current operational environment of portable computer 400.

Either event would cause the operating system to be notified by an interrupt such as an Advanced Configuration and Power Interface Specification (ACPI) interrupt. The ACPI interrupt indicates that a change has occurred in the operating environment of portable computer 400. The operating system will pass control to micro-controller 440, which is now responsible for transferring control information over a system management (SM) bus 441 to power control circuit 460 in order to adjust the power state of processor 410.

In this embodiment, power control circuit 460 is implemented within portable computer 400 and includes a frequency control circuit 470 and a voltage control circuit 480. Frequency control circuit 470 is coupled to micro-controller 440 through SM bus 441, and is further coupled to processor 410, first bridge unit 420 and second bridge unit 430 through communication lines 442–444, respectively. Additionally, voltage control circuit 480 is coupled to micro-controller 440 through SM bus 441 and power supply circuit 450 via communication line 445.

As shown, frequency control circuit 470 is used to load a variable bus ratio into processor 410 during a reset condition. Frequency control circuit 470 includes a first memory element 471. Preferably implemented as non-volatile memory, first memory element 471 is configured to contain a plurality of bus ratios used to automatically set processor 410 to operate at different power states. These bus ratios are set forth as 4-bit values, although any bit width may be used as alternative embodiments. The first memory element 471 is coupled to a first select element 472 (e.g., a multiplexer, combinatorial logic, etc.) via a plurality of input ports 473$_1$–473$_n$ ("n" being a positive whole number). Each of the plurality of input ports 473$_1$–473$_n$ is assigned to receive a particular bus ratio. A first register element 474 is coupled to SM bus 441 and a select port 475 of the first select element 471 in order to select which bus ratio is to be output from first select element 472 based on control information received from micro-controller 440. The status of the last bus ratio set (which is the current processor bus ratio) is stored in register set 493 for comparison purposes.

The output of the first select element 472 is transferred to a first series of input ports of a second select element 476. A second series of input ports is coupled to a corresponding plurality of leads of second bridge unit 430. For example, when second bridge unit 430 is implemented as a PIIX4™ component, the second series of input ports is coupled to the following leads via communication line 444; namely, interrupt (INTR), non-maskable interrupt (NMI), ignore numeric error (IGNEE#) and A20 mask (A20M#). The first reset lead (CRESET#) of first bridge unit 420 is coupled to a select port 477 of second select element 476 via communication line 443. When an active CRESET# signal is placed on communication line 443, it causes the bus ratio from first select element 472 to be loaded into processor 410 via communication line 442. Otherwise, information normally propagating through communication line 444 (e.g., information output from the INTR, NMI, IGNEE# and A20M# leads of second bridge unit 430) is loaded into processor 410.

Referring still to FIG. 4, used to vary voltage supplied to processor 410 by power supply circuit 450, voltage control circuit 480 is coupled to power supply circuit 450 through communication line 445. This communication line 445 is used to transfer a selected voltage code which, in turn, is used to program the amount of supply voltage provided to processor 410 via communication line 446. The programming of power supply circuit 450 may be performed through a number of schemes. For example, as shown, a plurality of voltage codes may be contained in a second memory element 481. Of these voltage codes, a first voltage code signals power supply circuit 450 to provide a base (or minimum) voltage to processor 410. The remaining voltage codes would represent unique voltages which are greater than the base voltage. As an alternative embodiment, the voltage codes may be configured so that each voltage code represents equivalent voltage increments throughout a voltage range supported by processor 410 beginning at a minimum voltage (Vmin) set by power supply circuit 450 (e.g., a first voltage code signals power supply circuit 450 to provide a supply voltage equal to (Vmin+0.05) volts, a $m^{th}$ voltage code signals to provide a supply voltage of ((Vmin+(m× 0.05)) volts.

Voltage control circuit 480 includes the second memory element 481, a third select element 482 and a second register element 483. The second memory element 481, preferably implemented as non-volatile memory, contains programmable voltage codes which may be programmed during manufacture. The second memory element 482 may be a separate component, or alternatively, may be configured as a particular storage location of memory contained in first memory element 471. The voltage codes are transferred into input ports of third select element 482. Under control of the micro-controller 440, second register element 483 controls selection of which voltage code is output to power supply circuit 450.

Figure 5A:
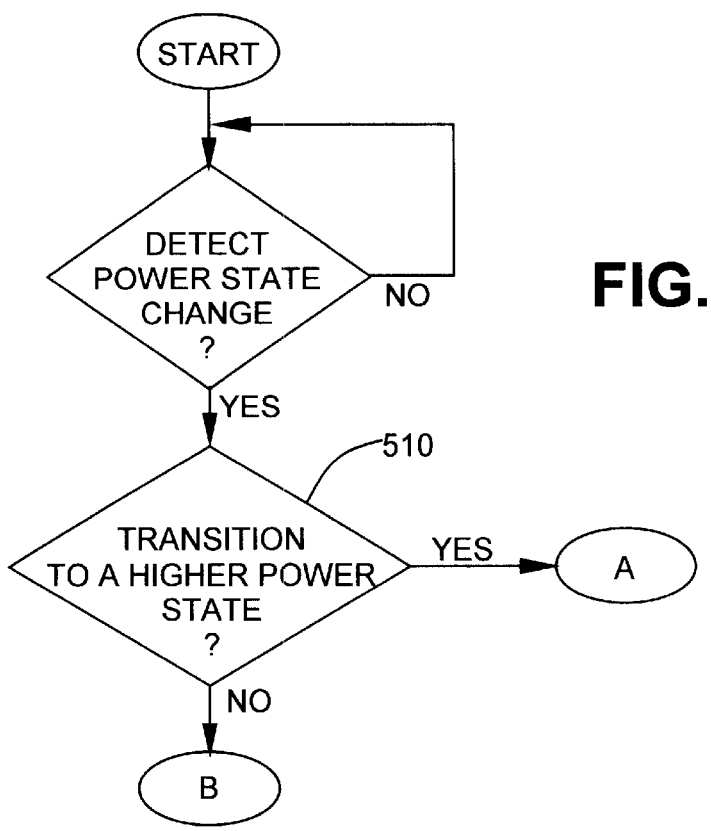

Referring now to FIGS. 5A–5C, the operations of the power control circuit of FIG. 4 in scaling the voltage and frequency of the processor in order to adjust power usage of the portable computer is shown. First, a determination is made whether the operating environment of the portable computer matches the current voltage and frequency setting or has changed, requiring at least the processor to undergo a power state transition (Step 500). This may be accomplished through internal logic (e.g., interlock mechanisms) signaling that a certain event has occurred which requires a change in power state (e.g., dock a portable computer in a docking station, connect to an operational power supply brick, etc.).

If no alteration of the power state is necessary, the power control circuit maintains the portable computer in its current power state. However, if the operating environment has changed, a determination is made if the operating environment has transitioned to a higher power state than its current power state (Step 510). For example, a transition from a low power state to an intermediate or high power state; a transition from an intermediate power state to a high power state; or transition from one intermediate power state to a higher intermediate power state.

In the case where the transition is to a higher power state than before, an interrupt is made requesting control of power management to be passed to the micro-controller, which is now responsible for controlling operating characteristics, in this case an increase of supply voltage and operating frequency (Steps 520 and 525). First, the micro-controller signals the voltage control circuit to program the power supply circuit to increase the supply voltage to an appropriate level prescribed for the higher power state (Step 530). This increase in the supply voltage is applied immediately. Next, the micro-controller signals the frequency control circuit to increase the operating frequency of the processor to an operating frequency prescribed for the higher power state by loading a particular bus ratio (Step 535). However, this increase is not applied until after the processor is reset.

Before resetting the processor, processor state information is stored for retrieval at a later time (Step 540). Then, the processor is reset by activating CPURST#. Concurrent to the activation of CPURST#, CRESET# is a signal which is activated and stays active for a sufficient time after CPURST# is removed to cause the particular bus ratio to be loaded into the processor (Step 545). Thereafter, the processor state information is restored and the processor resumes operations at the higher supply voltage and operating frequency (Step 550).

In the case where the transition is to a lower power state, an interrupt is made requesting control of the power management to be passed to the micro-controller (Steps 555 and 560). The micro-controller signals the frequency control circuit to decrease the operating frequency of the processor to a prescribed operating frequency (Step 565). This is accomplished by initially storing processor state information, and thereafter, resetting the processor and loading a reduced bus ratio through activation of CPURST# and CRESET# signals, respectively (Steps 570 and 575). As a result, the bus ratio corresponding to the decreased operating frequency is loaded into the processor.

Next, the micro-controller signals the voltage control circuit to program the power supply circuit to decrease the supply voltage to an appropriate level prescribed for the lower power state (Step 580). This decrease in the supply voltage is applied immediately by the power supply circuit. Thereafter, the processor state information is restored and the processor resumes operations at the lower supply voltage and operating frequency (Step 585).

Figure 6:
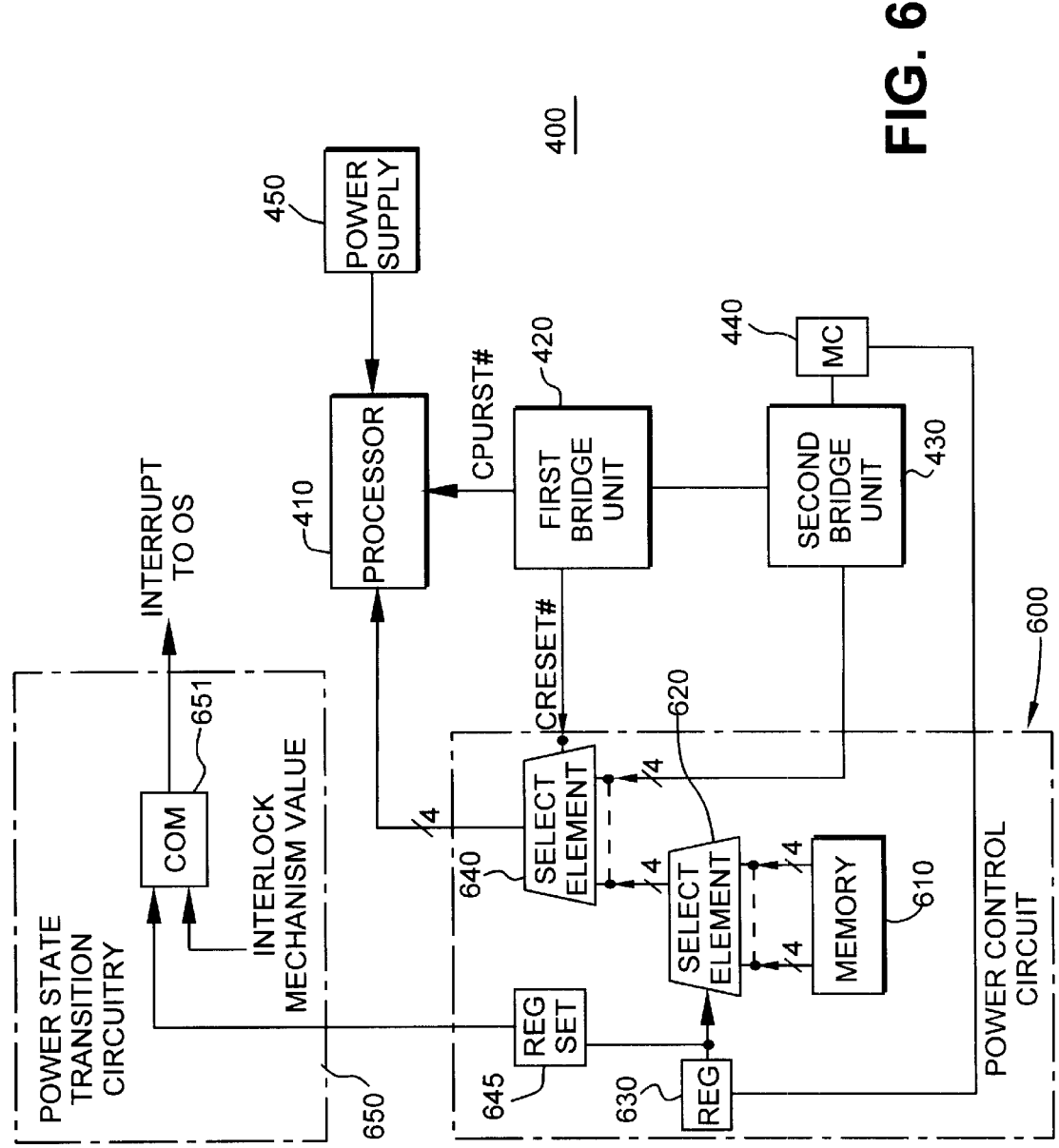
FIG. 6 is an illustrative block diagram of a hardware product implemented with a second embodiment of the power control circuit which controls power state transitions of an electronic device through frequency scaling.

Referring to FIG. 6, another illustrative embodiment of the power control circuit employed within a hardware product is shown. The hardware product (e.g., portable computer 400) comprises processor 410, first bridge unit 420, second bridge unit 430, micro-controller 440, power supply circuit 450, and a power control circuit 600. In this embodiment, the power control circuit 600 is used to load an updated bus ratio into processor 410 during a reset condition. Thus, even though this technique does not provide optimal power savings with minimal change in operating frequency, the operating frequency of processor 410 may be altered to lower the power state of processor 410 and power usage by portable computer 400.

In this embodiment, power control circuit 600 includes a memory element 610. Preferably implemented as non-volatile memory, memory element 610 is configured to contain a plurality of bus ratios used to place the portable computer 400 is different power state. These bus ratios are input into a first select element 620. Controlled by micro-controller 440, a register element 630 is coupled to a select port of first select element 620 in order to select which bus ratio is to be output therefrom. Likewise, a register set 645 is used to temporarily store the status of the last bus ratio set. This status is used by a comparator set 651 of power state transition circuit 650 to determine whether or not a change in power state should occur based on detection of the presence of an external source with an enhanced cooling mechanism.

The selected bus ratio is loaded into a first series of input ports of a second select element 640. This bus ratio is loaded into processor 410 upon the first bridge unit 420 transmitting an active CRESET# signal to second select element 640. This is performed when processor 410 is reset to receive the updated bus ratio. Otherwise, information normally propagating through INTR, NMI, IGNEE# and A20M# leads of second bridge unit 430 are loaded into processor 410.

Figure 7A:
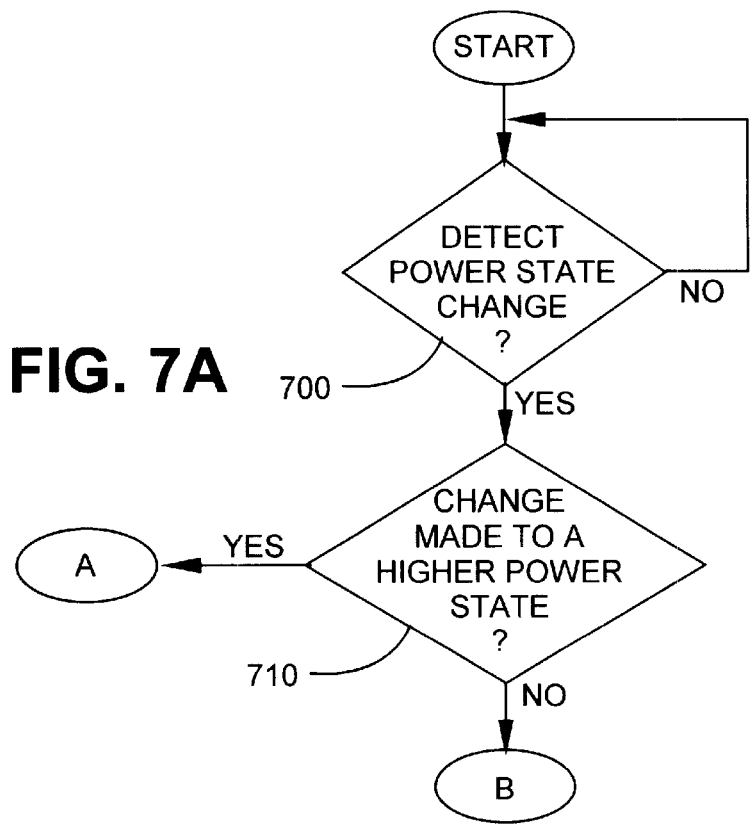
FIGS. 7A–7C are illustrative flowcharts of the operations performed by the present invention in order to increase or reduce performance of any electronic device based on the operating environment of its hardware product.
Figure 7B:
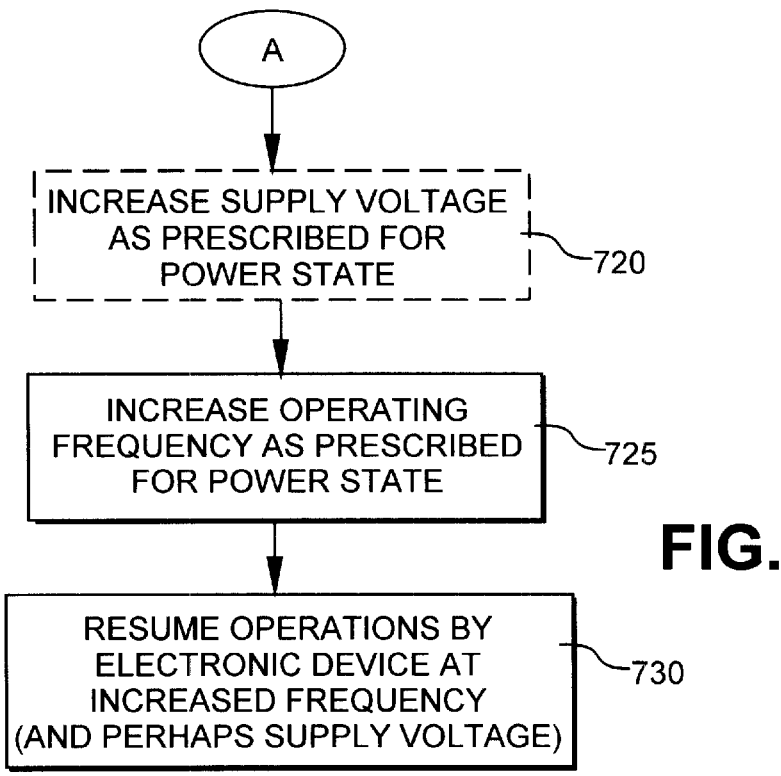
Figure 7C:
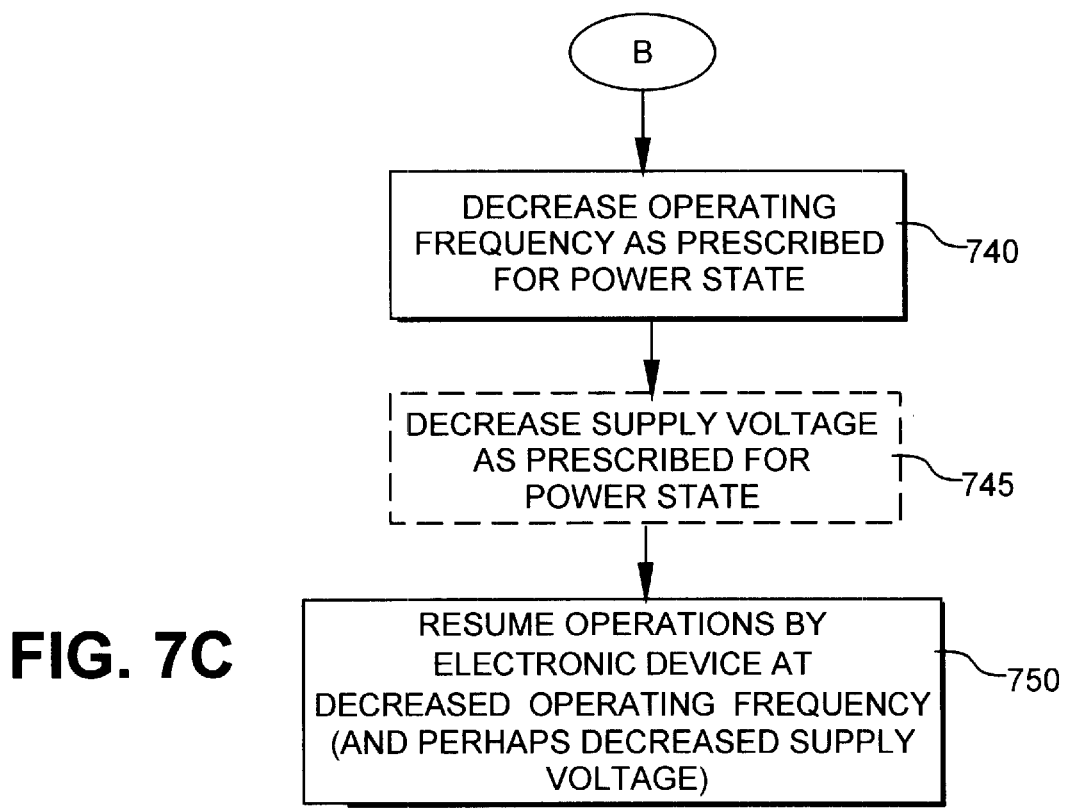

Referring now to FIGS. 7A–7C, the operations of the circuit implemented in altering at least the operating frequency of an electronic device, and possibly the supply voltage as denoted by dashed line boxes. The operating frequency (and perhaps voltage) is altered based on an operating environment of the hardware agent employing the electronic device. This is performed in order to adjust power usage of the hardware product as necessary. By adjusting power usage due to the hardware product's operating environment, sub-system temperature of the hardware product can be controlled as well as other characteristics (e.g., battery life).

First, a determination is made whether the operating environment of the hardware product has changed, requiring the electronic device to undergo a power state transition (Step 700). This may be accomplished through a number of well-known mechanisms. For example, during power-up of the hardware product, it may be configured to initially perform at a certain power state (e.g., a high power state) and then, to signal circuitry or software controlling power management to transition to a predetermined power state based on the current operating environment of the hardware product. Further power state transitions may be monitored through mechanical interlock comparison with power state.

If no power state transition is necessary, the circuit maintains the hardware product in its current power state. However, if a power state transition is necessary, a determination is made if the operating environment has transitioned to a higher power state than its current power state (Step 710). In the case where the transition is to a higher power state, control of power management may be passed to an agent (e.g., circuitry and/or software) which is now responsible for controlling an increase of possibly supply voltage and operating frequency. As an optional step, this agent causes a power supply circuit for the hardware product to increase the supply voltage to an appropriate level prescribed for the higher power state (Step 720). As a requisite step, the agent causes an increase of the operating frequency of the electronic device to a prescribed operating frequency associated with the detected operating environment (Step 725). This may be accomplished by loading a code into the electronic device. The code may be interpreted by the electronic device as a command to operate as a certain operating frequency or to increase or decrease the operating frequency by a certain amount.

Thereafter, the electronic device resumes operations at the higher supply voltage and a higher operating frequency (Step 730).

In the case where the transition is to a lower power state, control of power management may be passed to an agent (e.g., circuitry and/or software) which is now responsible for controlling a decrease of possibly supply voltage and operating frequency. As a requisite step, the agent causes a decrease in operating frequency of the electronic device to a prescribed operating frequency associated with the detected operating environment (Step 740). This may be accomplished in a manner as described above. As an optional step, this agent causes a power supply circuit for the hardware product to decrease the supply voltage to an appropriate level prescribed for the lower power state (Step 745). Thereafter, the electronic device resumes operations at the lower operating frequency and possibly lower supply voltage in order to reduce power usage of the hardware product (Step 750).

The present invention described herein may be designed in many different embodiments evident to one skilled in the art than those described without departing from the spirit and scope of the present invention. The invention should, therefore, be measured in terms of the claims which follow.

What is claimed is:

1. A method comprising:
   determining whether a hardware product is coupled to a power supply brick by a flexible thermal-electrical cable, the power supply brick including circuitry that converts alternating current (AC) power into direct current (DC) power and an enhanced cooling mechanism; and
   adjusting at least an operating frequency of an electronic device implemented within the hardware product from a first operating frequency to a second operating frequency in response to determining that the hardware product Is coupled to the power supply brick having the enhanced cooling mechanism, the second operating frequency corresponding to a power state from one of at least three power states for the electronic device.

2. The method of claim 1, wherein the act of adjusting includes increasing the operating frequency to the second operating frequency, being higher than the first operating frequency, in response to determining that the hardware product is coupled to the power supply brick having the enhanced cooling mechanism.

3. The method of claim 2, wherein the act of adjusting further includes adjusting a supply voltage of the electronic device from a first voltage level to a second voltage level prior to increasing the operating frequency to the second operating frequency.

4. The method of claim 3, wherein the first voltage level is equivalent to the second voltage level, provided the first voltage level and the second voltage level are capable of operating in connection with the second operating frequency.

5. The method of claim 1, wherein the operating frequency is decreased through throttling a clocking signal, normally used to produce the first operating frequency, to produce the second operating frequency.

6. The method of claim 1, wherein the act of adjusting includes decreasing the operating frequency to the second operating frequency, being less than the first operating frequency, in response to determining that the hardware product is decoupled from the enhanced cooling mechanism.

7. The method of claim 6, wherein the act of adjusting further includes adjusting a supply voltage of the electronic device from a first voltage level to a second voltage level after decreasing the operating frequency to the second operating frequency.

8. The method of claim 7, wherein the second voltage level is less than the first voltage level in order to optimize power reduction.

9. The method of claim 1, wherein the hardware product is a portable computer.

10. The method of claim 9, wherein the enhanced cooling mechanism includes a heat transfer element to engage with a heat transfer element located in the hardware product.

11. The method of claim 1, wherein the hardware product is a camcorder.

12. The method of claim 1, wherein the enhanced cooling mechanism is an air cooling duct system including a fan and a first heat exchange duct to be connected to a second heat exchange duct of the hardware product.

13. The method of claim 12, wherein the heat exchange duct of the hardware product is coupled to a heat transfer element that conveys heat from the electronic device to air in the second heat exchange duct.

14. The method of claim 12, wherein the fan of the air cooling duct system causes increased airflow through the first and second heat exchange ducts.

15. The method of claim 1, wherein the enhanced cooling mechanism is a heat sink, a fan situated proximate to the heat sink to cool the heat sink, and a flexible heat pipe having a first end coupled to the heat sink and a second end for coupling to a heat pipe in the hardware product that conveys heat away from the electronic device.

16. The method of claim 1, wherein determining whether a hardware product is coupled to an enhanced cooling mechanism by comparing a predetermined interlock mechanism value with a status of bus ratio and status of supply voltage in the hardware product.

17. A method comprising:
   determining whether a hardware product is coupled to a power supply brick by a flexible thermal-electrical cable, the power supply brick including circuitry that converts alternating current (AC) power into direct current (DC) power and an enhanced cooling mechanism; and
   adjusting a power state of an electronic device implemented within the hardware product from a first power state to a second power state in response to determining that the hardware product is coupled to the power supply brick having the enhanced cooling mechanism, the second power state being one of at least three power states for the electronic device.

18. The method of claim 17, wherein the adjusting to the second power state includes applying a voltage to the electronic device at a voltage -level greater than a voltage level associated with the first power state.

19. The method of claim 17, wherein the adjusting to the second power state further includes increasing a clocking signal from a first operating frequency at the first power state to a second operating frequency at the second power state being greater than the first operating frequency of the first power state.

20. The method of claim 7, wherein the determining includes checking whether the hardware product is currently powered by one or more batteries.

21. The method of claim 17, wherein the adjusting to the second power state includes applying a voltage to the electronic device at a voltage level less than or equal to a voltage level associated with the first power state.

22. The method of claim 17, wherein the enhanced cooling mechanism is a heat sink, a fan situated proximate to the heat sink to cool the heat sink, and a flexible heat pipe having a first end coupled to the heat sink and a second end for coupling to a heat pipe in the hardware product that conveys heat away from the electronic device.

23. The method of claim 17, wherein determining whether a hardware product is coupled to an enhanced cooling mechanism by comparing a predetermined interlock mechanism value with a status of bus ratio and status of supply voltage in the hardware product.

24. A circuit adapted to alter performance of an electronic device implemented within a hardware product, the circuit comprising:
   a control circuit to adjust a power state; and
   a power state transition circuit coupled to the control circuit, the power state transition circuit to detect a change in an operating environment of the hardware product in response to the hardware product being coupled to a power brick by a flexible thermal-electrical cable, the power brick including circuitry that converts alternating current (AC) power into direct current (DC) power and an enhanced cooling mechanism.

25. The circuit of claim 24, wherein the hardware product is a portable computer.

26. The circuit of claim 25, wherein the enhanced cooling mechanism includes a heat transfer element to engage with a heat transfer element located in the hardware product.

27. The circuit of claim 24, wherein the hardware product is a camcorder.

28. The circuit of claim 24, wherein the enhanced cooling mechanism is an air cooling duct system including a fan and a first heat exchange duct to be connected to a second heat exchange duct of the hardware product.

29. The circuit of claim 28, wherein the heat exchange duct of the hardware product is coupled to a heat transfer element that conveys heat from the electronic device to air in the second heat exchange duct.

30. The circuit of claim 28, wherein the fan of the air cooling duct system causes increased airflow through the first and second heat exchange ducts.

31. The circuit of claim 28, wherein the enhanced cooling mechanism is a heat sink, a fan situated proximate to the heat sink to cool the heat sink, and a flexible heat pipe having a first end coupled to the heat sink and a second end for coupling to a heat pipe in the hardware product that conveys heat away from the electronic device.

32. The method of claim 24, wherein detecting a change in an operating environment of the hardware product by comparing a predetermined interlock mechanism value with a status of bus ratio and status of supply voltage in the hardware product.

33. A computer comprising:
   a processor implemented in a hardware product; and
   a control circuit coupled to the processor, the control circuit to adjust a power state of the processor in response to detecting that the hardware product is coupled to a removable enhanced cooling a mechanism by a flexible thermal-electrical cable, the control circuit comparing a predetermined interlock mechanism value with a status of bus ratio and status of supply voltage in the hardware product to adjust the power state to one of at least three power states for the processor.

34. The computer of claim 33, wherein the detecting includes the processor being supplied with a voltage by a power supply brick..

35. A hardware product comprising:
   an electronic device configured to operate in one of at least two power states;
   a receptacle on an exterior surface of a casing that encloses the electronic device, the receptacle including a plurality of electrical connectors and a thermal connector;
   a power supply brick including circuitry that converts alternating current (AC) power into direct current (DC) power and an enhanced cooling mechanism;
   a thermal-electrical cable that flexibly couples the power supply brick and the receptacle, the thermal-electrical cable including a plurality of electrical conductors and a flexible thermal conductor; and,
   a power state transition circuit coupled to the electronic device to select one of the at least two power states responsive to coupling of the power supply brick to the receptacle.

36. The hardware product of claim 35, wherein the power state transition circuit detects a change in an operating environment of the hardware product by comparing a predetermined interlock mechanism value with a status of bus ratio and status of supply voltage in the hardware product.

37. The hardware product of claim 35, wherein the power state transition circuit detects the electronic device being powered by one or more batteries.

38. The hardware product of claim 35, wherein the power state transition circuit detects the electronic device being supplied with a voltage by the power supply brick.

39. The hardware product of claim 35, wherein the enhanced cooling mechanism further comprises a fan.

40. The hardware product of claim 39, wherein the flexible thermal conductor is a heat pipe.

41. The hardware product of claim 35, wherein the enhanced cooling mechanism further comprises an active heat dissipation mechanism.

\* \* \* \* \*

UNITED STATES PATENT AND TRADEMARK OFFICE
CERTIFICATE OF CORRECTION

PATENT NO. : 6,601,179 B1  Page 1 of 1
DATED : July 29, 2003
INVENTOR(S) : Jackson et al.

It is certified that error appears in the above-identified patent and that said Letters Patent is hereby corrected as shown below:

Column 8,
Line 49, delete "44OBX™", insert -- 440BX™ --.

Signed and Sealed this

Twentieth Day of January, 2004

JON W. DUDAS
*Acting Director of the United States Patent and Trademark Office*